E. VON VARGYAS.
HEADLIGHT SCREEN.
APPLICATION FILED APR. 22, 1920.

1,372,919.

Patented Mar. 29, 1921.
3 SHEETS—SHEET 1.

Inventor

Eugene Von Vargyas.

E. VON VARGYAS.
HEADLIGHT SCREEN.
APPLICATION FILED APR. 22, 1920.
1,372,919.
Patented Mar. 29, 1921.
3 SHEETS—SHEET 2.
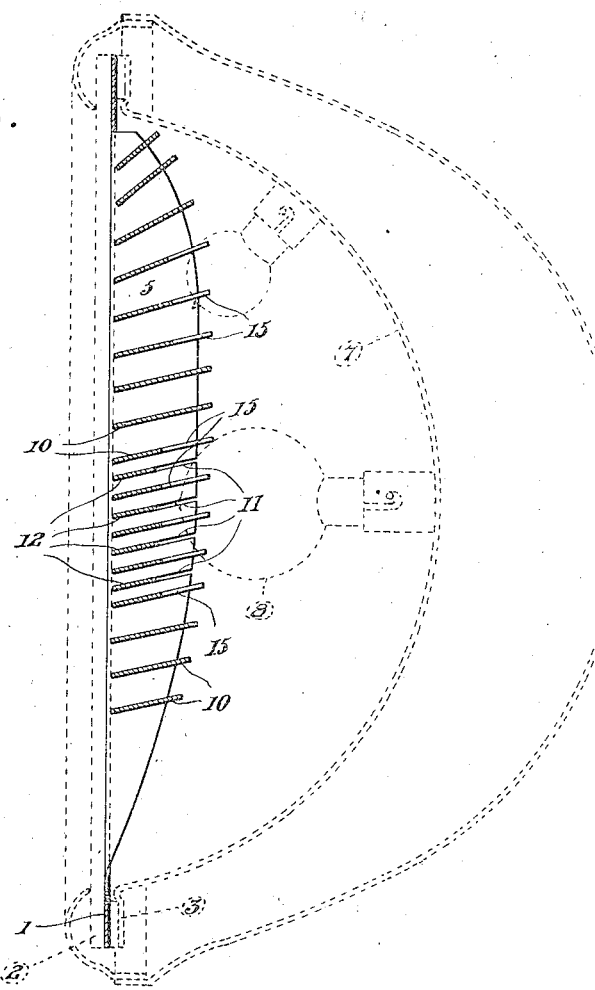
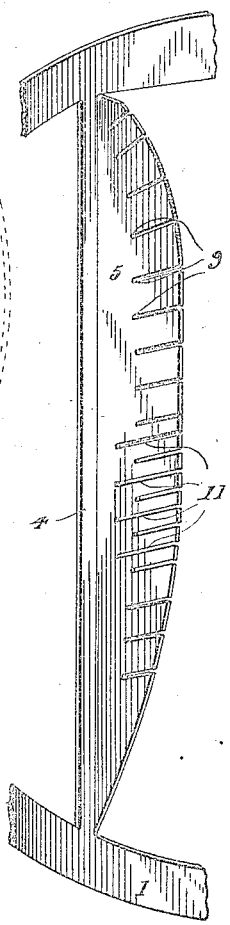
Inventor
Eugene Von Vargyas.

Inventor

Eugene Von Vargyas.

UNITED STATES PATENT OFFICE.

EUGENE VON VARGYAS, OF WASHINGTON, DISTRICT OF COLUMBIA, ASSIGNOR, BY DIRECT AND MESNE ASSIGNMENTS, TO "OWL" HEADLIGHT COMPANY, A CORPORATION OF THE DISTRICT OF COLUMBIA.

HEADLIGHT-SCREEN.

1,372,919.　　　　Specification of Letters Patent.　　Patented Mar. 29, 1921.

Application filed April 22, 1920. Serial No. 375,862.

*To all whom it may concern:*

Be it known that I, EUGENE VON VARGYAS, a citizen of the United States, residing at Washington, in the District of Columbia, have invented certain new and useful Improvements in Headlight-Screens, of which the following is a specification.

This invention pertains to the class of automobile headlights and has particular relation to that type of devices designed to control the dangerous glare thrown out by automobile headlights.

The primary object of the invention is to provide a light controlling structure which may be mounted within an automobile headlight without marring or defacing the reflector surface and without exerting undue strain upon any of the lamp parts. The light controlling structure comprises, generally speaking, a plurality of horizontally spaced inclined vanes mounted upon or carried by a pair of uprights, and a supporting ring which maintains the device in its adjusted position within the lamp reflector. The horizontally spaced inclined vanes in themselves, do not constitute a part of my invention, since it is, from my knowledge of the prior art, an old and well-known expedient in the control of the rays of light from a light source to arrange a series of vanes or slats in fixed or adjustable relation across a light opening of a signal lamp, search-light or head-light, for the purpose of confining, deflecting, or altering the projected light for definite purposes. In automobile headlights, obviously, the deflection or alteration is for the purpose of obviating the glare which is dangerous to pedestrians and drivers of approaching vehicles and to confine the light to the road.

A further object of the invention is to provide a light controlling or deflecting device embodying certain mechanical features of construction which will constitute a simple, practical device economical to manufacture, and having a sightly and unpretentious appearance when applied to a lamp.

With these primary objects in view, and such others as may hereinafter appear, my invention will now be fully set forth and described, reference being had to the accompanying drawings, in which—

Fig. 4 is a further side view showing the manner of its mounting, Fig. 5 is a detail perspective view of a portion of the frame structure.

Figure 6:
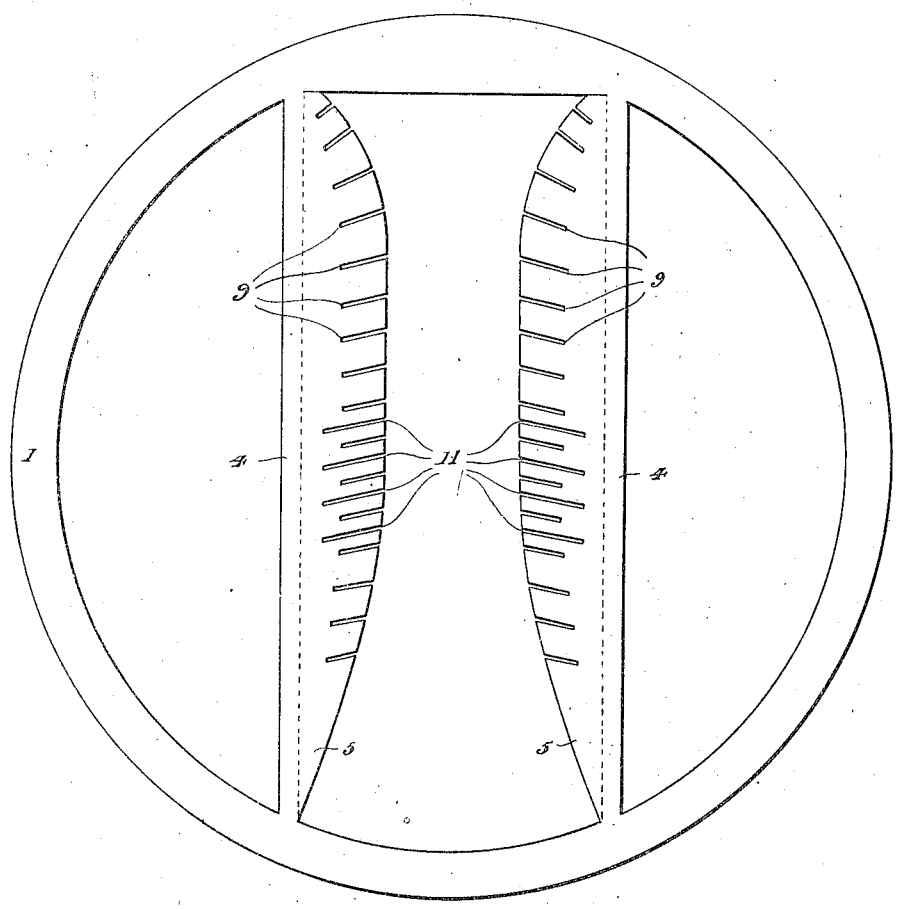
Fig. 6 is a plan view of a blank used in making the frame structure.
Figure 7:
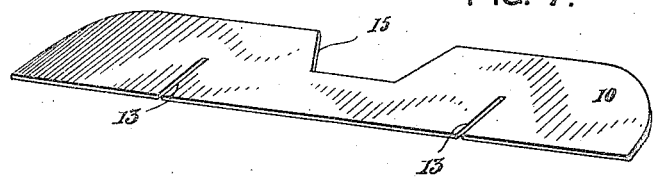
Fig. 7 is a perspective view of one of the vanes.
Figure 8:
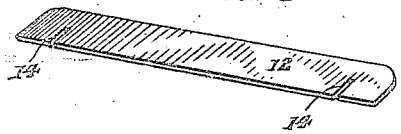
Fig. 8 is a perspective of another of the vanes.

Referring more particularly to the drawings, the numeral 1 indicates a flat supporting ring, which may be stamped from sheet material of suitable weight and which is adapted to be clamped between the glass or lens 2 and the rim 3 of the mirror 7 of a head-light of usual construction as defined in dotted lines in Fig. 4. The ring 1 carries a pair of parallel vertical chord-like standards 4, from which are turned rearwardly the wings 5. Preferably the ring 1, the standards 4 and the wing 5 are stamped or otherwise shaped from a unitary blank, as best shown in Fig. 6.

When turned rearwardly out of the plane of the ring 1 into opposed parallel relation, the wings 5 project into the space within the area inclosed by the mirror 7, upon opposite sides of the bulb 8 and form vertical light intercepting vanes for eliminating side glare. Cut into the free edges of the wings 5 are a set of slots or recesses 9 which carries a set of vanes 10 while a second group of slots 11 support a supplemental set of vanes 12 which are smaller than 10 and provide an increased multiplicity of light controlling elements directly in front of the bulb 8.

The angles of inclination of the vanes 10 and 12 with relation to the light source is defined by the angles at which the slots 9 and 11 are cut, and it should be noted that these angles vary gradually from the bottom of wings 5 toward the top of the device. The coöperation of the slots 9 and 11 with similar slots 13 and 14 cut into the vanes determines the penetration of the latter into the wings 5 and the degree to which the elements are locked together.

Figure 1:
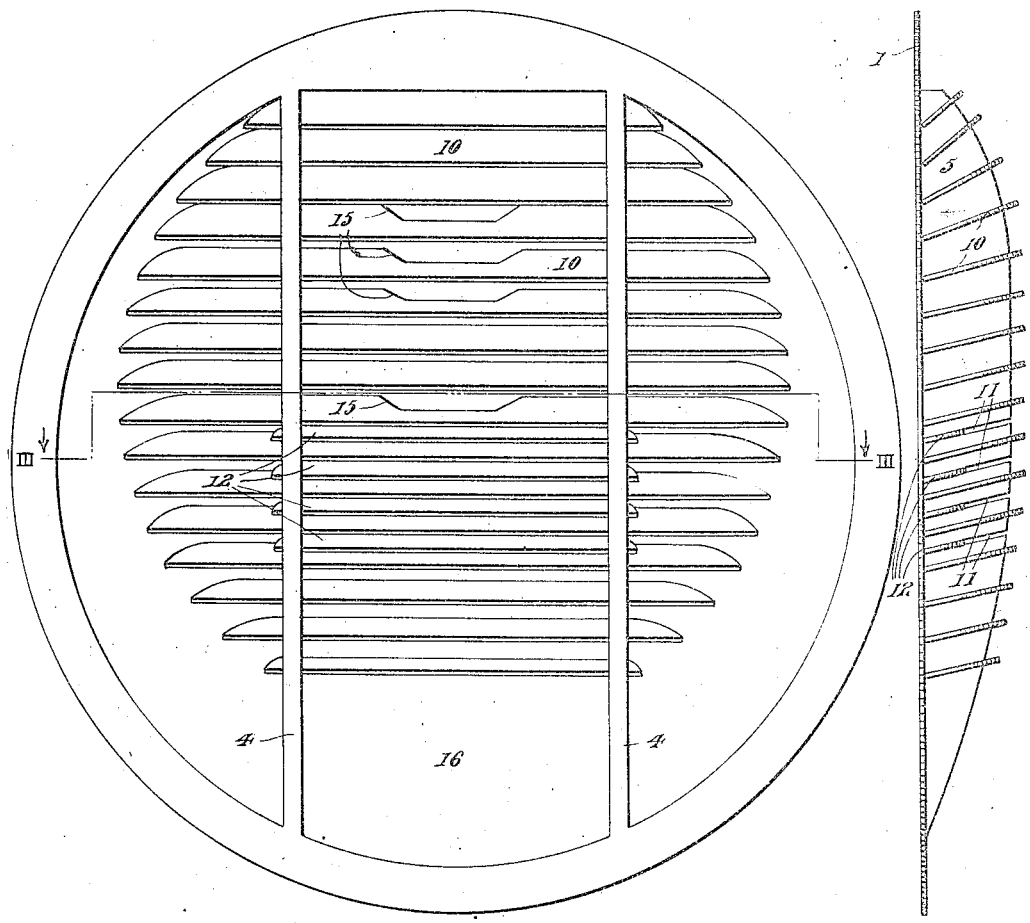
Figure 1 is a front view of the device.
Figure 2:
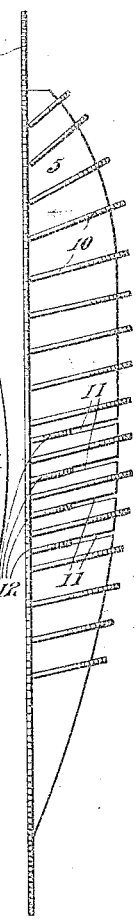
Fig. 2 is a side view thereof.
Figure 3:
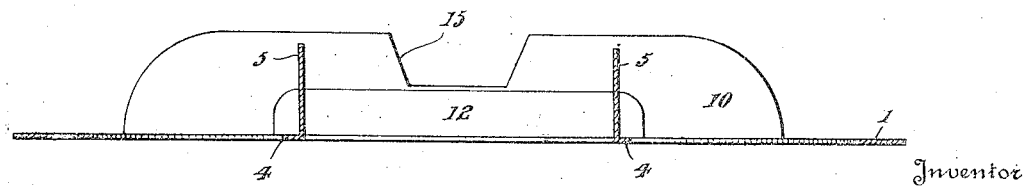
Fig. 3 is a section on line 3—3 of Fig. 1, looking in the direction of the arrows.

As is best evidenced in Fig. 1, the vanes 10 are of such graduated lengths that they practically define a screened circular space which is eccentric to the annulus of the lamp reflector so that the uppermost point of the latter and the uppermost point of the circular space are coincident. There is thereby defined an open space 16 below the screened area which is crescent shaped and has its widest portion at the lower part of the lamp where it provides for the unrestricted passage of light from the light source into the road.

It will be apparent from the foregoing description that I have provided in an automobile light screen a very effective and simple device which may be quickly applied to any automobile headlight and which, by being carried within the lamp, serves its useful function without detracting from the appearance of the lamp.

I claim—

1. An automobile head light screen comprising, in combination, vertical L shaped, spaced standards, said standards providing wings projecting rearwardly and adapted to cut off side glare, securing means integral with said standards at top and bottom adapted to be clamped behind a lens, and a series of vanes extending transversely of and attached to said wings, said vanes sloping downwardly and forwardly.

2. An automobile head light screen comprising the combination of supporting means adapted to be clamped behind a headlight lens, a pair of standards formed integral with said means at top and bottom, wings bent rearwardly from said standards, arranged in parallel relation and adapted to cut off side glare, vanes extending transversely of and attached to said wings, the lower vane being spaced above the lower supporting means.

3. An automobile head light screen comprising the combination of supporting means adapted to be clamped behind a headlight lens, a pair of standards formed integral with said means at top and bottom, wings bent rearwardly from said standards, arranged in parallel relation and provided with downwardly and forwardly inclined slots, said wings adapted to cut off side glare, vanes extending transversely of said wings having slots in their edges coacting with the material of said wings at the bottoms of the slots therein, whereby said vanes are attached to said wings, the lower vane being spaced above the lower supporting means.

4. An automobile head light screen comprising the combination of supporting means adapted to be clamped behind a headlight lens, a pair of standards formed integral with said means at top and bottom, wings bent rearwardly from said standards, arranged in parallel relation and adapted to cut off side glare, vanes extending transversely of and attached to said wings, said vanes covering a circular area less than that of the lens, and leaving a crescent-shaped open space below the screened area for unobstructed passage of light to the road.

In testimony whereof I have affixed my signature.

EUGENE VON VARGYAS.